United States Patent [19]

Yvard et al.

[11] 4,180,824

[45] Dec. 25, 1979

[54] HEAD FOR ELECTRICALLY PRINTING AN IMAGE

[75] Inventors: Marcel Yvard, Ollainville; Jean-Claude Decuyper, Elancourt; Michel Beduchaud, Villebon sur Yvette, all of France

[73] Assignee: Compagnie Industrielle des Telecommunications Cit-Alcatel, Paris, France

[21] Appl. No.: 914,179

[22] Filed: Jun. 9, 1978

[30] Foreign Application Priority Data

Jun. 13, 1977 [FR] France .............................. 77 18012

[51] Int. Cl.² ................... G01D 15/06; G03G 15/044; B41J 3/04; H04N 1/22
[52] U.S. Cl. ..................................... 346/154; 346/155
[58] Field of Search .............. 346/154, 165, 163, 162, 346/139 A, 139 C, 155

[56] References Cited

U.S. PATENT DOCUMENTS

| | | | |
|---|---|---|---|
| 2,967,083 | 1/1961 | Gallentine | 346/165 |
| 3,453,647 | 7/1969 | Bernstein | 346/165 |
| 3,827,056 | 7/1974 | Vano | 346/139 C |
| 3,984,844 | 10/1976 | Tanno | 346/139 C |
| 4,023,184 | 5/1977 | Stillman | 346/139 C |
| 4,030,107 | 6/1977 | Tagawa | 346/139 C |
| 4,082,619 | 4/1978 | Dehnert | 346/165 |

*Primary Examiner*—Jay P. Lucas
*Attorney, Agent, or Firm*—Roland Plottel

[57] ABSTRACT

The present invention relates to a printing bar with a plurality of styli (10) for printing an image.

It includes a first network of conductive tapes (1) insulated from one another and in which one end of each of them forms a printing stylus (10) and n diagonal matrices for addressing the styli whose columns are formed by the conductive tapes (1) of this first network and are fed via resistances (R) in electric contact with the tapes (1) of said first network and in which the rows common to the n matrices are formed by conductive tapes (7) of a second network and are connected to the columns via diodes (D) connected in the columns or in the rows.

Application: a facsimile transmission installation.

6 Claims, 7 Drawing Figures

HEAD FOR ELECTRICALLY PRINTING AN IMAGE

The present invention relates to a bar for printing an image on sensitive paper. The printing bar is used in particular in a document reproduction unit of a facsimile transmission installation.

In an installation of this type, an analyzed document whose contents are transmitted to the reproduction unit is restored by a printing head or bar which scans a chosen sensitive paper along successive lines. The printing head or bar is energized by a data signal received by the reproduction unit and which defines the contents of the scanned line for printing the successive image dots along the scan line in question.

Image dots, and hence dots of variable density, are formed by causing, by reaction, a localized modification of the paper used so as to obtain a variation of its optical appearance, for example colouring. The paper used at the receiving unit can therefore be e.g. electro-sensitive, electro-catalytic or thermo-sensitive. Since the paper used is, for example, electro-catalytic, an image dot is printed by localized application on the paper of a stylus made of catalytic material chosen as a function of the paper and by passing an electric current between the stylus and the paper; catalysis accompanied by a change in the colour of the paper is thus caused. In this example, the paper can be constituted by an external layer of sensitive material, a conductive sub-layer and a base paper which supports them. The stylus can for example be made of or covered with silver; it presses against the external layer.

A complete image line can be printed by moving a single stylus printing head along a scan line of paper. A complete scan line can also be printed by a printing bar which has as many printing styli as there are image dots to the line. The printing bar is static in relation to the scan line in question; there will be only a relative step by step movement between the paper and the printing bar.

Such a bar may comprise a first network of conductive tapes which are insulated from one another and each of which has a first end which forms a respective one of the styli. A second network of conductive tapes, likewise insulated from each other and orthogonal to the first network is connected to the first network to form a plurality of matrices.

The present invention aims to constitute a printing bar with a plurality of styli controllable via the matrices and easy to produce industrially.

The present invention provides a bar for printing an image on sensitive paper by scanning the paper along successive lines, comprising a plurality of printing styli aligned along the length of the scan line, and comprising n square matrices for addressing the styli, the matrices being formed by a first network of electrially conductive tapes which are insulated from one another and are divided into n identical sets of conductors and each of which has one end connected to a respective stylus, and by a second network of electrically conductive tapes perpendicular to the first network and having as many tapes as there are conductive tapes in each set of the first network and selectively connected to the conductive tape of the first network to form the said n matrices, characterized in that the first network and the second network of conductive tapes are formed respectively on a first insulative plate and on a second insulative plate, and are disposed on the interior faces of the plates when assembled together and are isolated from each other at the intersections between conductive tapes except for the selective connections for forming each of the said matrices and in that for each matrix:

the conductive tapes of the first network, referred to to as the columns of the said matrix, are fed from a first feed terminal attributed to the said matrix, via respective resistances each of which is formed by a layer of resistive material deposited on one of the plates and connecting each of the columns of the matrix to a common conductive strip formed on the other plate, and insulated from the tapes of the said other plate and electrically connected to the said first terminal, the conductive tapes of the second network referred to as the rows of each matrix, are individually controlled from respective second feed terminals and are selectively connected to the columns via diodes each formed by a pellet of semi-conductive material which is mounted on one of the two plates defining the row and the column in question at their intersection.

The stylus addressing matrices are therefore integrated in the printing bar at the plates which carry or include the styli.

Other characteristics and advantages of the present invention will become apparent from the description of embodiments illustrated in the accompanying drawings in which.

The printing bar which will be described with reference to the accompanying drawings is intended to form an image on sensitive paper, the image being printed by scanning the paper along successive lines and printing successive image dots along each line. By way of example, the printing bar forms a part of a facsimile reproduction assembly; it is static from the mechanical point of view, the sensitive paper facing the printing bar and on which the image is formed moving step by step under the action of known drive means for printing successive scan lines of the paper.

By way of example, the printing bar forms a part of a document reproduction assembly of a facsimile transmission installation. It allows an image definition of 1728 image dots per scan line of 218-mm paper. The paper chosen is of the electro-catalytic type which is generally very sensitive, i.e. it requires only little energy to be printed. This paper will for example have a light initial appearance, dark characters being printed by colouring of the paper.

Figure 1:
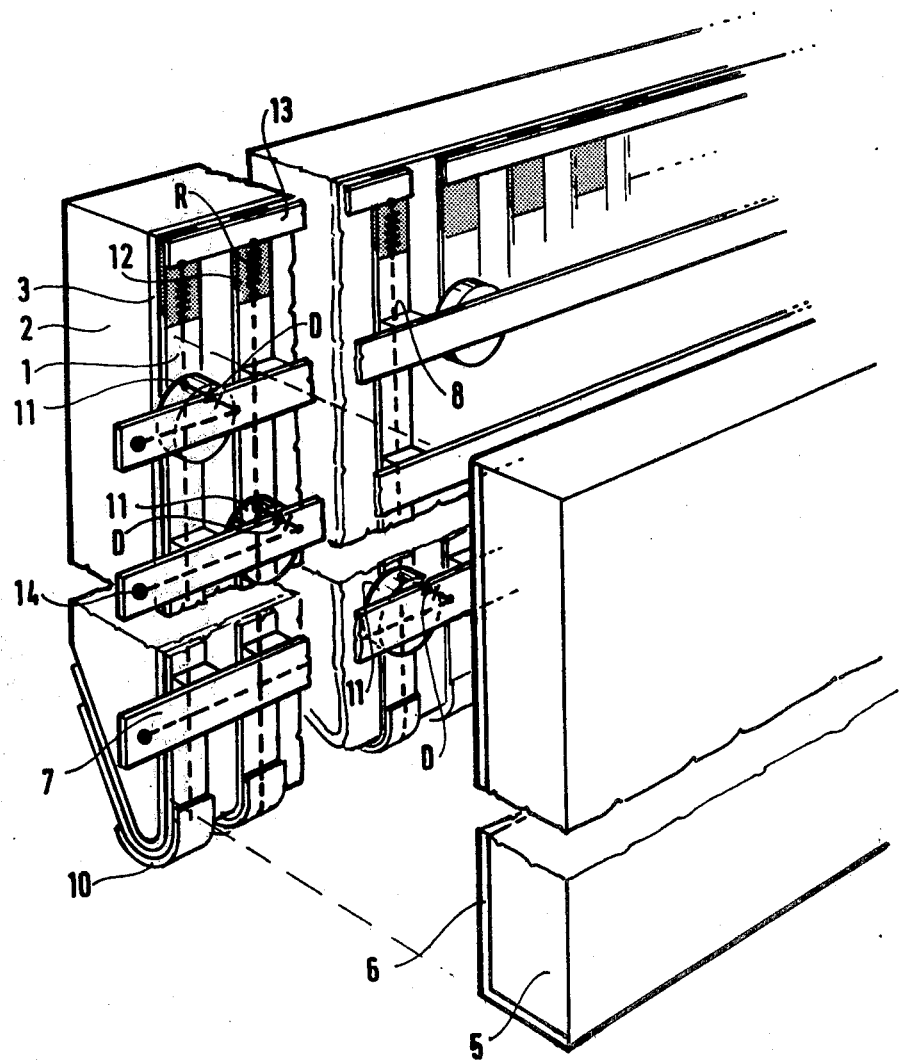
FIG. 1 shows an arrangement of components of a printing bar in accordance with the invention.

FIG. 1 shows an arrangement of the component parts of the printing bar. The printing bar is constituted by a first network of conductive tapes 1 which are parallel and insulated from one another. A first end 10 of each tape 1 is covered with a layer of material chosen as a function of the type of paper used; for example it is covered with silver. This end 10 may be the end part of the tape 1 or it may be an intermediate part at a fold in the tape 1. The end 10 forms a printing stylus designated hereinafter by this same reference 10. There will be 1728 conductive tapes 1; the 1728 styli 10 extend regularly over 216 mm. The conductive tapes 1 are carried by a support 2 by means of an insulative plate 3. The support 2 is insulative and rigid; for example, it can be made of glass or of injected plastics. This support, which is at least 216 mm long, has a suitable shape: it has a substantially rectangular-trapezoidal cross-section whose acute angle between the large base and the adjacent side has been rounded.

Figure 2:
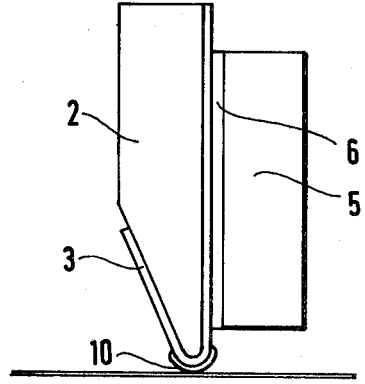
FIG. 2 is a cross-section of the printing bar in FIG. 1.

On referring to FIGS. 1 and 2, it is seen that the support 2 with a rounded point is partially covered by the flexible and insulative plate 3. This plate 3 is made integral with the support, for example by adhesive. It extends over the length of the support and covers the large base of its cross-section and extends beyond the rounded point.

Figure 3:
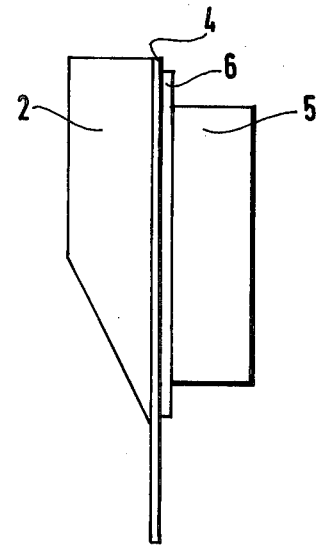
FIG. 3 is a cross-section of a printing bar in accordance with a variant in relation to FIG. 2.

In a variant shown in FIG. 3, the support 2 has a rectangular-trapezoidal cross-section but its point is not rounded. It is partially covered by a rigid and insulative plate. This plate is made integral with the support, for example by adhesive. It extends over its whole length along the edge which forms the large base of its cross-section and extends beyond the point of the support.

In these two embodiments, in FIGS. 1 and 2 and in FIG. 3, the shape of the support and of the plate which carry the conductive tapes (not shown in FIGS. 2 and 3) must allow localized contacts to be formed between the surface of the paper and all the styli along the line of the styli (at the rounded point or at the free end of the rigid plate).

The first network of conductive tapes 1 is formed on the plate 3 (4) according to a technique which closely resembles that used for constituting printed circuits. For example, this first network will be formed by masking and photoengraving techniques. It is also possible to cover one surface of the plate completely with a conductive film and to proceed by partial etching of the conductive film only to maintain conductive paths which then constitute the tapes 1. The tapes 1 carried on the plate are partially covered with silver at their end 10 to constitute the respective styli after assembly of the plate on the support. In a variant, the tapes 1 can initially contain a percentage of silver to avoid this extra addition of silver at the ends which form styli.

The printing bar includes a stylus addressing circuit. This addressing circuit is integrated in the printing bar.

On referring to FIGS. 1 and 2 and to FIG. 3, it is seen that the printing bar includes a second support 5 made of material analogous to that of the support 2. This second support 5 has a rectangular cross-section. One of its large surfaces is covered with an insulative and flexible plate 6. This plate 6 is made integral with the support 5, for example by adhesive. This plate 6 carries a second network of conductive tapes 7 which are shown only in FIG. 1. This second network of conductive tapes 7 is formed in an analogous manner to that of the first network of conductive tapes 1.

There are sixteen conductive tapes 7 in the second network. They are parallel to and electrically insulated from one another. They extend over the length of the second support and its plate, i.e. over at least 216 mm. The two networks of conductive tapes 1 and 7 are orthogonal. Since the supports 2 and 5 are assembled together, the conductive tapes being on the inside, the conductors 1 and 7 constitute a matrix with rows formed by the tapes 7 and columns formed by the tapes 1. The rows designated by the same reference 7 and the columns designated by the same reference 1 are insulated from each other by a layer of insulative adhesive 8 deposited at least at each intersection between the rows and the columns, except for some intersections as will be seen hereinafter. This insulative adhesive 8 also assembles the two supports 2 and 5 provided.

The preceding insulation at the intersections could of course be obtained by a layer of insulative varnish or an intercalary sheet of insulative material, for example material known by the name of Mylar, the sheet being suitably pierced to keep the required intersections free from insulation. The supports 2 and 5 would then be assembled by means of an insulative adhesive for example inserted between the rows and/or columns or by purely mechanical means.

To constitute the stylus addressing circuits, it is seen in FIG. 1 that each conductive tape 1 carries a semiconductive part 11. These semiconductive parts 11 are spaced out up the height of the printing bar: sixteen successive semiconductive parts 11 are spaced out regularly substantially up the height of the printing bar and are disposed respectively facing the sixteen conductive tapes 7 with which they are in electric contact. This same disposition is kept for the following semiconductive parts taken in sets of sixteen; these semiconductive parts are carried respectively by the conductive tapes 1 divided into sets of sixteen. A diode D is also formed between each tape 1 and a tape 7.

Each conductive tape 1 is also in electric contact with a layer of resistive material 12, for example a carbon deposit. This resistive material 12 covers the second end of each tape 1 and runs along the plate 3, extending the tape 1 in question. A resistance R is thus formed connected in series on each tape 1. A conductive strip 13 covers the free ends of the resistive deposits 12 which are electrically connected to the tapes 1 of the same set (sixteen tapes 1). This conductive strip 13 will be connected to a first stylus feed terminal (not shown in FIG. 1).

The electric circuit thus formed has been shown schematically in broken lines: a tape 1, hence the stylus 10, is fed from the first feed terminal and from the strip 13 via the associated electric resistance R. It will be observed that each assembly of 16 conductive tapes 1 has its own first feed terminal or its own strip 13 and that from one assembly of sixteen tapes to another, the first feed terminals or the strip such as 13 are independent. The electric circuit formed also includes the diode D which connects the conductive tape 1 in question to a conductive tape 7 whose free end is advantageously gold plated and constitutes a second feed terminal 14. This diode D makes it possible or impossible to short-circuit the stylus 10 on the end of the tape 1 in question from the second feed terminal. It will be observed that in an assembly of sixteen tapes, a given tape 1 (column) is connected to a given tape 7 (row) via a diode, this tape 1 being insulated from the other tapes 7 by the deposits 8.

In the printing bar thus constituted, the 1728 conductive tapes 1 will be formed at a pitch of 125μ. Each tape has a width of about 90μ; it will be observed however that this dimension is not critical: it can be reduced to about 30μ or increased up to 110μ. The sixteen conductive tapes 7 will be for example at a pitch of 2 mm. The thickness of the layer of resistive material is not critical; its width will be about the same as that of the conductive tapes 1. The parts made of semiconductive material, in the form of a pellet, have a diameter of a few tenths of a millimeter, for example about 0.25 mm.

Figure 4:
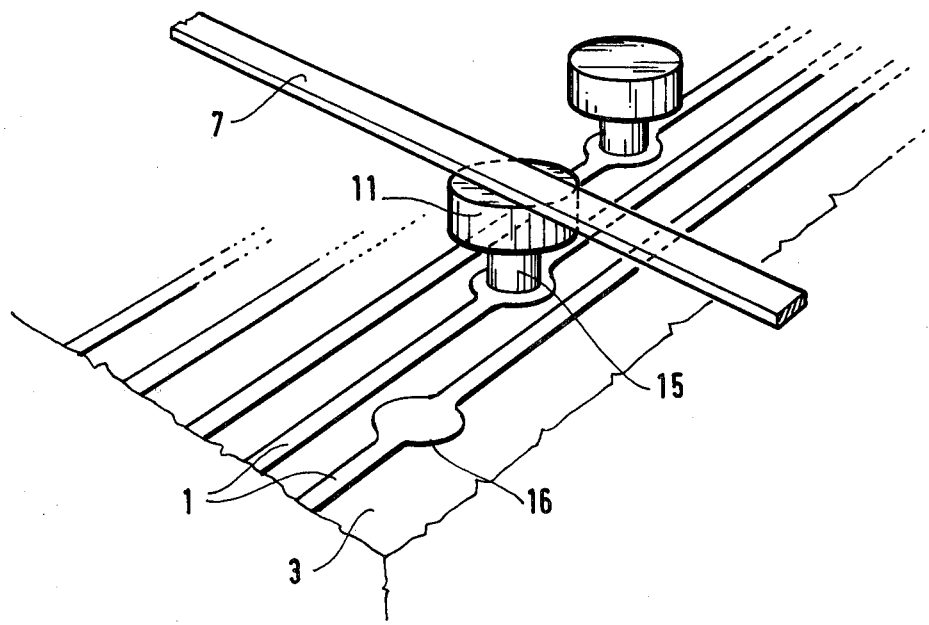
FIG. 4 shows, on a very much enlarged scale a detail of the constitution of the printing bar in accordance with the invention.

FIG. 4 shows on a very much larger scale the assembly of the parts made of semiconductive material on the conductive tapes 1. The part 11 made of semiconductive material is in the form of a pellet. To take into account the diameter of this semiconductive pellet (0.25 mm), the width of the conductive tapes 1 (in this case, about 40μ) and their spacing, the semiconductive pellet is installed on the corresponding tape 1 by means of a metal stub 15, made of copper, for example. At the location of the diode, the tape 1 is widened as shown at 16 and possibly has an extra metal coating to fix the stub 15 properly. The stub 15 is fixed at 16 to the tape 1 by welding, soldering or glued with a conductive adhesive and/or is maintained by pressure in the assembled printing bar. The large diameter of the semiconductive pellet in relation to the small spacing between conductive tapes 1 requires, indeed, that the pellet should be shifted to the side of the conductive tapes 7 whose pitch is sufficient to prevent any contact between the semiconductive pellet in question and either of the two tapes 7 adjacent to the one which is electrically connected to it.

Of course, the semiconductive pellets 11 can be fixed to the tapes 7 at suitable locations; they are electrically connected to the respective tapes 1 by the metal stubs 15 and held by pressure or fixed on the tapes 1.

Figure 5:
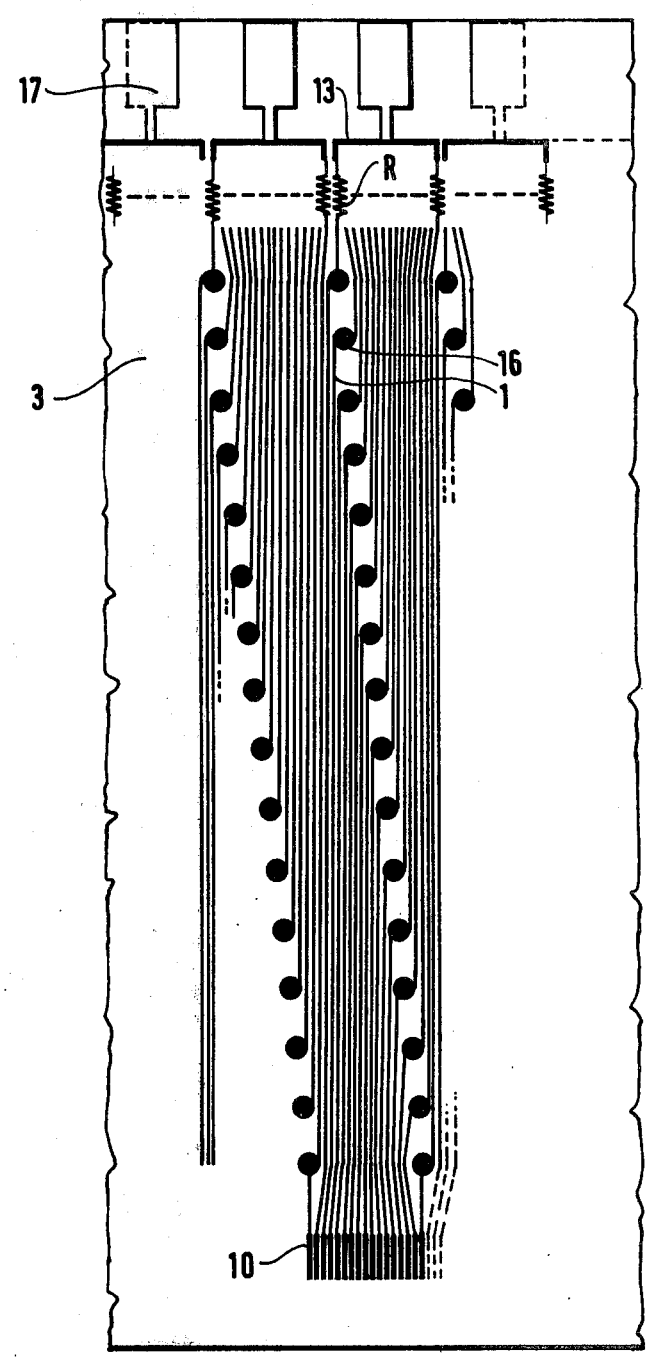
FIG. 5 shows schematically a preferred arrangement of components of the printing bar.

For the same reasons—large diameter of the semiconductive pellets and small spacing between the tapes 1—a configuration such as the one shown in FIG. 5 is preferably adopted for the tapes 1. In this FIG. 5, the locations of the diodes on the tapes 1 are schematically shown by small black circles designated by reference 16. The tapes 1 carried by the plate 3 are closely spaced at different levels (locations 16) on either side of these locations 16. Each tape is 50 to 80μ wide; the tapes are spaced at 60 to 30μ from one another. Sixteen successive tapes 1 are thus formed over a width of 2 mm, providing, on each tape 1, as large a diode location 16 as possible. This location can be 0.3 mm in diameter and can directly receive a semiconductive pellet. In practice, to ensure a single conductive junction between just one of the tapes 1 and a tape 7 in the set of sixteen tapes 1, it is preferred to adopt both the configuration of tapes 1 as shown in FIG. 5 and an assembly of the semiconductive pellets at the locations 16 of the tapes 1, by means of a metal stub 15 as shown in FIG. 4.

In FIG. 5, although the tapes 1 have been closely spaced, it is seen that the styli 10 remain regularly spaced apart. The resistances R have also been shown respectively in series with the tapes 1 and connected in sets of sixteen, by the strip 13 at a feed terminal 17 assigned to each set.

Figure 6:
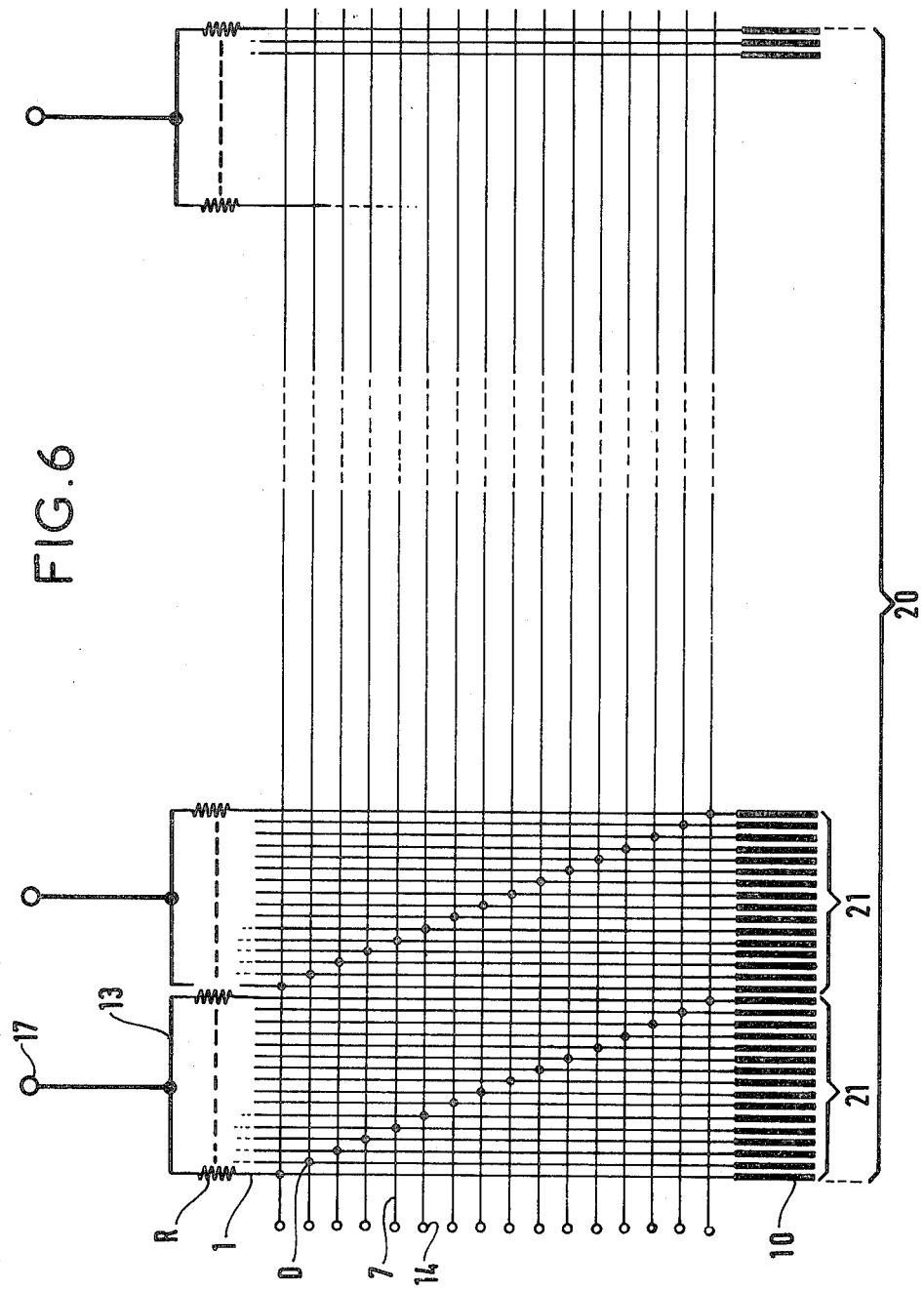
FIG. 6 shows the circuit diagram of the printing bar.

FIG. 6 shows the circuit diagram of the printing bar including the stylus 10 addressing circuit. The complete printing bar is designated as 20. The addressing circuit which is integral therewith constitutes 108 diagonal matrices, with each diode D schematically shown by a spot at each of the sixteen junctions between sixteen columns and sixteen rows.

In each matrix, the sixteen columns are constituted by the conductive tapes 1 of one set and the sixteen rows are constituted by the sixteen conductive tapes 7. The sixteen columns, designated by the reference 1, are fed respectively via the sixteen resistances R from the feed terminal 17 connected to the resistances by the conductive strip 13. The feed terminals such as 17 are independent from one matrix to another. The sixteen rows are common to the 108 matrices 21. Each of the sixteen rows is connected to diodes carried by the columns of same order in each of the 108 matrices. They are fed from the feed terminals 14; these terminals 14 are independent from one another and are each assigned to a row.

By way of an example, it is stated that the voltage applied to one of the terminals 17 will be 0 or 5 volts; that applied to one of the terminals 14 will be 0 or 5 volts. Since the first stylus of the first matrix 21 must be controlled for a black dot to be printed, a potential of 5 volts will be applied to the terminal 17 of this first matrix as well as to the terminal 14 connected to the first line. A potential of 0 volts will be applied to the other terminals such as 17 which feed the columns of the other matrices as well as to the terminals 14 and connected to the fifteen other rows. At this first matrix, a potential of 5 volts is applied by the terminal 17 to the sixteen columns. However, only the diode D to which a potential of 5 volts is applied will be blocked and will prevent current from passing through the diode: the first stylus is therefore fed and the current in this stylus causes a black dot to be printed. The fifteen other diodes of this first matrix which are fed with 0 volts are conductive: the residual current in these fifteen styli which is due to the saturation voltage of the diodes is is quite insufficient to cause any printing. At the other matrices, all the diodes disposed on the first row in question are fed with a potential of 5 volts. However, this remains without effect since the columns of the other matrices are at 0 volts: the styli of the other matrices are not fed. The diodes make it possible or impossible to short-circuit the styli of a single matrix, independently from one another. The diodes also make it possible to select a single matrix among the 108 existing matrices.

Figure 7:
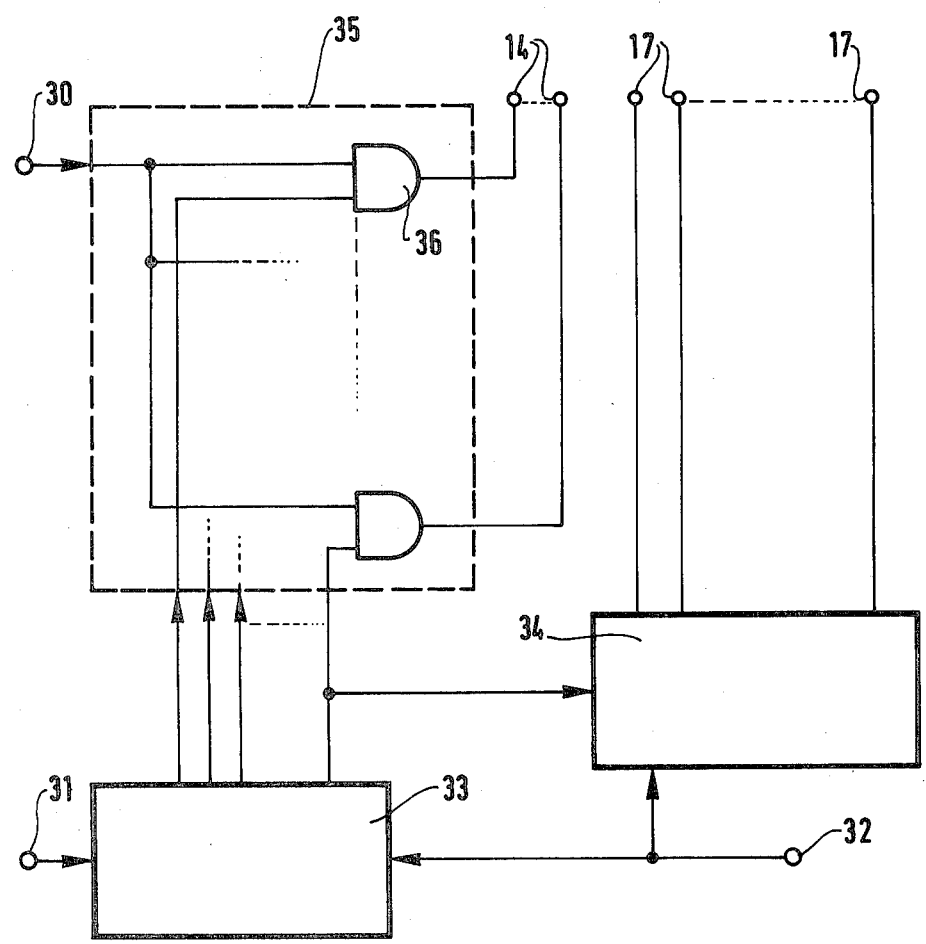
FIG. 7 shows an embodiment of the printing bar control circuit.

FIG. 7 shows schematically an embodiment of an addressing circuit control circuit.

This control circuit has been shown with two control inputs. One of the inputs 30 receives the data signal for printing a line; this signal is composed of pulses with a logic level 0 (0 volts) for printing a white dot (stylus addressed but not controlled) or with a logic level 1 (5 volts) for printing a black dot (stylus addressed and controlled, i.e. a current passes through it). The input 31 receives clock pulses at the rate of the printing of the dots along a scan line of the paper. The data signal and the clock signal are synchronous. A third input of the circuit 32 receives the signal for synchronizing the beginning of a scan line.

The control circuit of the 108 matrices 21 includes a modulo 16 counter 33 connected to the input 31 which receives the clock signal. A modulo 108 counter 34 is connected to the output of the order 16 of the counter 33. It has 108 outputs connected respectively to the first 108 feed terminals 17 of the 108 matrices to allow them to be fed successively.

The sixteen outputs of the counter 33 are connected to a combinative logic circuit 35 which receives the data signal from the input 30. This logic circuit 35 includes sixteen AND gates such as 36 which receive firstly in parallel the data signal coming from the input 30 and then connected respectively to the sixteen second feed terminals 14 of the 108 stylus addressing matrices.

During operation, the beginning of line synchronization signal forces the modulo 108 counter 34 into the state 1, for example on detecting the end of this signal.

A potential of 5 volts is applied to the sixteen columns of the first matrix 21. This same signal coming from the terminal 32 forces the modulo 16 counter 33 into the state zero. The clock pulses which follow this line synchronization signal make the state of the counter progress by 16 to control the AND gates 36 which are therefore successively conductive for the data signal. For the state 1 of the counter 33, since the corresponding pulse of the data signal is at the level 1 (black dot) the first row of the 108 matrices will be fed at a potential of 5 volts, the other rows being at 0 volts. The first stylus writes a black dot. For this same state of the counter 33, since the corresponding pulse of the data signal is at the level 0 (white dot), the first line and the other lines of the matrices are at 0 volts; the first stylus writes nothing (the appearance of the paper at this point is kept white). The styli are thus successively addressed and fed.

The present invention has been described with reference to particular examples in the figures and with reference to a particular application for printing on a paper which originally has a light appearance. It is evident that these examples cannot limit the scope of the invention.

It is also evident that the modes of organization of the conductive tapes illustrated and described have been chosen by way of examples and that without going beyond the scope of the invention, any details can be modified which make it possible to perform the required functions. In particular, it will be observed that it is possible to deposit resistive layers 12 on the plate 6 at suitable locations for them to come into contact with the respective conductive tapes 1 and the respective strips 13. The strips 13 can also be formed on the plate 6.

We claim:

1. A bar for printing an image on a sensitive paper by scanning the paper along successive lines, comprising a plurality of printing styli aligned along the length of the scan line, and comprising n square matrices for addressing the styli, the matrices being formed by a first network of electrically conductive tapes which are insulated from one another and are divided into n identical sets of conductors and each of which has one end connected to a respective stylus, and by a second network of electrically conductive tapes perpendicular to the first network and having as many tapes as there are conductive tapes in each set of the first network and selectively connected to the conductive tape of the first network to form the said n matrices, characterized in that the first network and the second network of conductive tapes (1, 7) are formed respectively on a first insulative plate (3,4) and on a second insulative plate (6), and are disposed on the interior faces of the plates when assembled together and are isolated from each other at the intersections between conductive tapes except for the selective connections for forming each of the said matrices and in that for each matrix (21):

the conductive tapes of the first network (1), referred to as the columns of the said matrix, are fed from a first feed terminal (17) attributed to the said matrix, via respective resistances (R) each of which is formed by a layer of resistive material (12) deposited on one of the plates and connecting each of the columns of the matrix to a common conductive strip (13) formed on the other plate and insulated from the tapes of the said other plate and electrically connected to the said first terminal, the conductive tapes of the second network (7), referred to as the rows of each matrix, are individually controlled from respective second feed terminals (14) and are selectively connected to the columns via diodes (D) each formed by a pellet of semi-conductive material (11) which is mounted on one of the two plates defining the row and the column in question at their intersection.

2. A printing bar according to claim 1 characterized in that the spacing between the conductive tapes of said first network is irregular and, for each of said diodes, is arranged to maximize the spacing between the conductive tape connecting to said diode and the two immediately adjacent conductive tapes of the same network.

3. A printing bar according to claim 1, or 2, characterized in that the pellet of semi-conductive material (11) is installed on a metal stub (15) which electrically connects the pellet with said corresponding conductive tape (1) of said first network.

4. A printing bar according to claim 1, or 2, characterized in that the said first network comprises 1728 conductive tapes (1) which form 1728 printing styli (10) and that the said conductive tapes (1) of the first network are divided into 108 sets of 16 conductive tapes each.

5. A printing bar according to claim 1, or 2, characterized in that the said conductive tapes are made of material which has catalytic properties.

6. A printing bar according to claim 1, or 2, characterized in that the said first end of each conductive tape which forms a stylus is covered in a conductive material which has catalytic properties.

* * * * *